Nov. 30, 1948.  T. OAKLEY  2,454,882
MEANS FOR OBTAINING LOAD AND VOLTAGE RECORDINGS
OF ELECTRICAL DISTRIBUTION SYSTEMS
ON A SINGLE RECORDER

Filed June 9, 1943  2 Sheets-Sheet 1

INVENTOR
THURMAN OAKLEY
BY
ATTORNEY

Nov. 30, 1948. T. OAKLEY 2,454,882
MEANS FOR OBTAINING LOAD AND VOLTAGE RECORDINGS
OF ELECTRICAL DISTRIBUTION SYSTEMS
ON A SINGLE RECORDER
Filed June 9, 1943 2 Sheets-Sheet 2
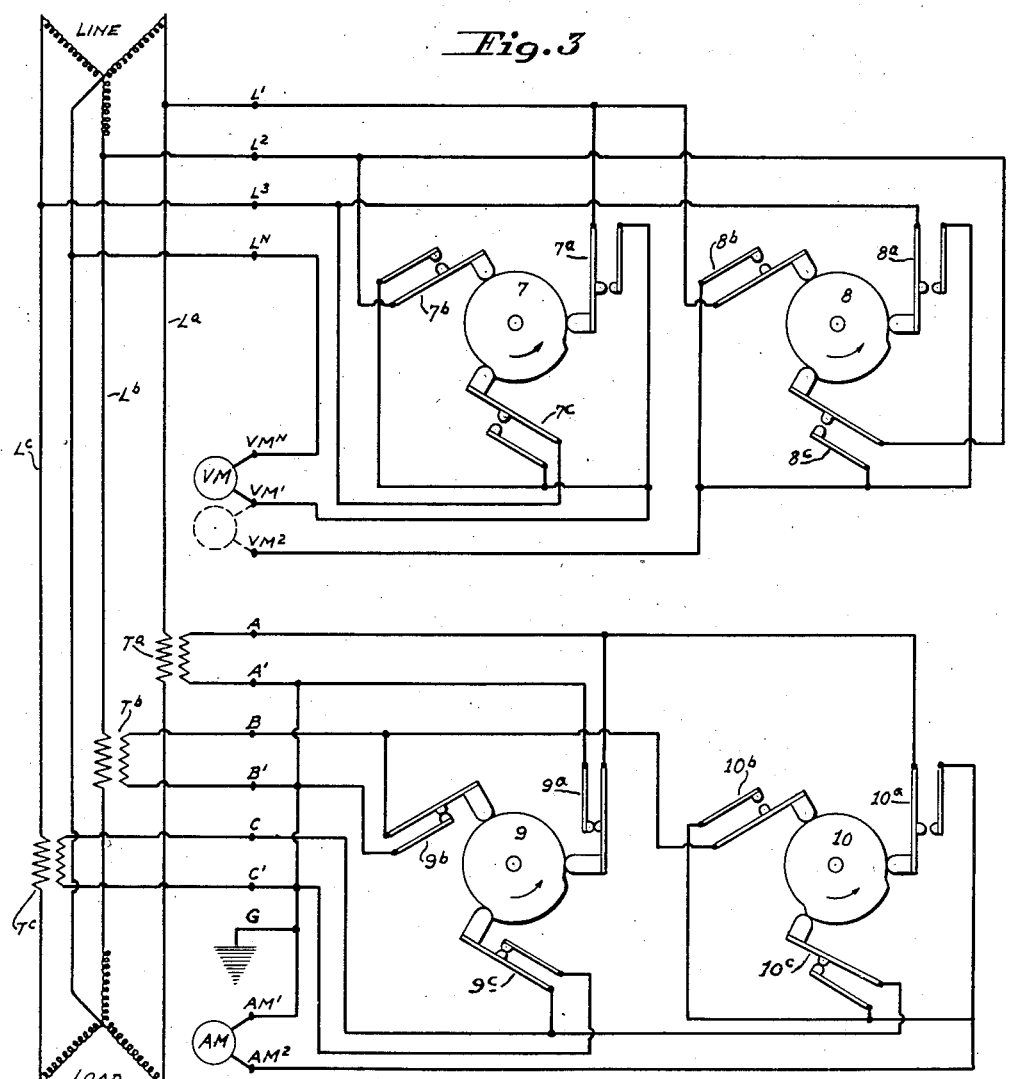
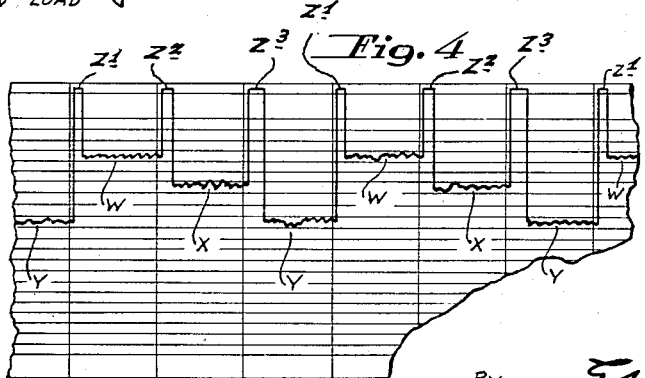
INVENTOR
THURMAN OAKLEY
BY
ATTORNEY

UNITED STATES PATENT OFFICE 2,454,882

MEANS FOR OBTAINING LOAD AND VOLTAGE RECORDINGS OF ELECTRICAL DISTRIBUTION SYSTEMS ON A SINGLE RECORDER

Thurman Oakley, Belleville, Ill., assignor to James R. Kearney Corporation, St. Louis, Mo., a corporation of Missouri Application June 9, 1943, Serial No. 490,182

2 Claims. (Cl. 346—33)

This invention relates generally to means for and methods of obtaining load and voltage recordings with respect to three-phase electrical power distribution systems, the predominant object of the invention being to provide improved means and an improved method whereby load recordings or voltage recordings may be obtained through the operation of a single recording instrument which is automatically placed in operative relation independently and successively with the various phases of the system in order to obtain independent, time-limited recordings of the different phases of the system.

Prior to this invention it was the practice to employ a separate and complete recording instrument for each independent phase of a three-phase system in order to obtain recordings relative to the load on the feeder during a given period. This has been true also with respect to the measuring of the voltage between phases of a three-phase system, as here also separate recording instruments have been employed for each independent phase of the system. Also, the recording instruments heretofore employed in obtaining load or voltage recordings in connection with the various phases of a three-phase system were usually provided with twenty-four hour charts, and as a result a very considerable period of time was necessarily consumed in obtaining recordings the equivalent of which are obtained in accordance with this invention in very greatly reduced periods of time.

Briefly stated, the present invention contemplates the use of a single recording instrument for obtaining load recordings, or a single recording instrument for obtaining voltage recordings, of the various phases of a three-phase electrical distribution system, means being provided to automatically connect the various phases of the system independently and successively to the recording instrument being employed so that only one phase is connected to the recording instrument at a time. In the interest of safety, a load recording instrument employed in accordance with this invention for recording ampere load, is not connected directly to the line of a high voltage system, but, instead, said recording instrument is connected to the secondary or low voltage winding of a current transformer. Likewise, when voltage is being recorded and where the voltage of the line is higher than would be safe to handle, the recording instrument may be connected to the secondary or low voltage winding of a potential transformer.

When a recording instrument is being employed, in accordance with this invention to record the ampere load on the feeder, three current transformers are connected into the three conductors of the line. The invention includes a selector switch mechanism that is preferably driven by a synchronous motor and this selector switch mechanism switches the recording instrument from one transformer to another at predetermined periods. In the use of current transformers it is necessary that the secondary circuits of the transformers be closed at all times and therefore means are provided for keeping these circuits closed when load recordings are being made. On the other hand, when voltage recordings are being made with the use of potential transformers, it is equally important that the secondary windings of the potential transformers be open at all times, except when they are connected to the recording instrument, and the present invention takes care of this situation.

Fig. 3 is a diagram of the invention showing the wire arrangement thereof.

Fig. 4 is a view illustrating a portion of a chart on which recordings are made in accordance with this invention.

Figure 2:
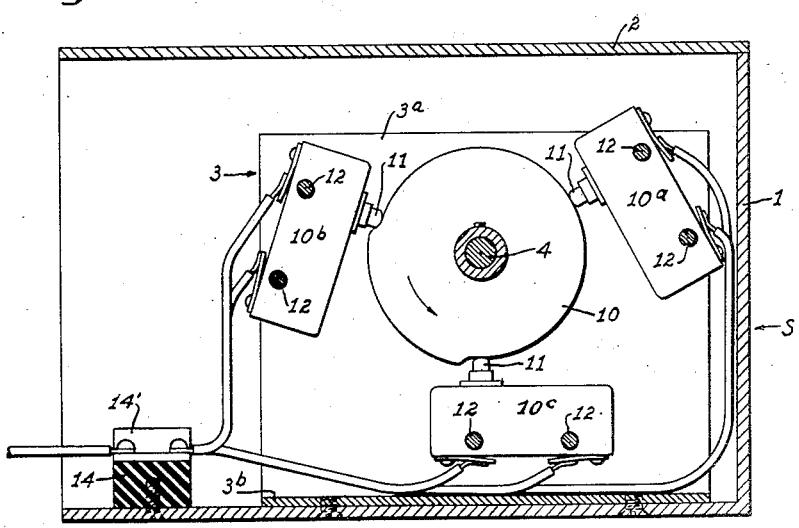
Fig. 2 is a vertical section taken on line 2—2 of Fig. 1.

In the drawings, wherein is shown for the purpose of illustration, merely, one embodiment of the invention S designates a selector switch mechanism which includes a housing I that is preferably provided with a movable cover or lid 2. Disposed within the housing I is a supporting frame 3 which is provided with a pair of spaced, upstanding plates 3a and a base portion 3b that is suitably fixed to the bottom wall of the housing I as is shown in Fig. 2. The spaced, upstanding plates 3a of the frame 3 support for rotary motion a shaft 4, said shaft being rotated at a constant speed by suitable means, such, for instance, as a synchronous motor 5, and a housing 6 is provided which encloses suitable speed-reducing gearing (not shown) which regulates the speed of rotation of the shaft 4. The shaft 4 has fixedly mounted thereon a plurality of cams, there being four of such cams illustrated in the drawings and said cams being designated respectively by the reference characters 7, 8, 9, and 10.

The selector switch mechanism includes also a plurality of switches, three of which are arranged in operative relation with respect to each of the cams 7, 8, 9, and 10, as is shown to good advantage in Fig. 2, the switches associated with the respective cams being designated by the reference characters 7a, 7b, and 7c, 8a, 8b and 8c, 9a, 9b, and 9c, and 10a, 10b, and 10c. The switches associated with the cams 7, 8, 9, and 10 are of conventional type, each including a plunger 11 which may be depressed to complete or disconnect the circuit of which the switch forms a part and which is urged outwardly by a spring (not shown) that moves the plunger outwardly when the force that depresses it has been removed. It is to be noted that the peripheral edge of each of the cams 7, 8, 9, and 10 contacts with the outer ends of the plungers of the switches associated with said cam, and that each cam is provided with a high spot which, in the operation of the selector switch mechanism S, moves into engagement with the plungers of said switches to move them inwardly to their circuit-completing or circuit opening position, the plungers remaining in their off normal positions only while they are held in a depressed condition by said high spots of the cams and being moved outwardly by their springs when the high spots of the cams have moved out of engagement therewith.

The switches associated with the cams 7, 8, 9, and 10 are supported by the spaced, upstanding plates 3a of the frame 3, said switches being arranged in batteries of four switches which are connected to the spaced, upstanding plates 3a by rods 12 and spacers 13. Also, the selector switch mechanism includes a block of insulating material 14 on which a plurality of terminals, bearing reference characters A, $A^1$, B, $B^1$, C, $C^1$, G, $AM^1$, $AM^2$, $L^1$, $L^2$, $L^3$, $L^N$, $VM^N$, $VM^1$, $VM^2$, $M^A$, and $M^B$, are mounted, said block of insulation 14 being provided with vertical extensions 14' which are disposed between the various adjacent pairs of terminals and outwardly of the end terminals, so as to provide barriers that prevent passage of current from one to an adjacent terminal, or from the end terminals to the adjacent walls of the housing 1. The terminals referred to have connected to the corresponding end portions thereof conductors which lead to the various switches associated with the cams 7, 8, 9, and 10, said terminals having conductors connected to their opposite end portions which serve to connect the various switches associated with the cams 7, 8, 9, and 10, to the different phases of a three-phase system.

Fig. 3 illustrates diagrammatically the circuits of the switching mechanisms S of the invention, with electrical connections to a conventional three-phase Y distribution circuit and to a recording voltmeter VM and to a recording ammeter AM. In Fig. 3 the cams 7, 8, 9, and 10, which are rotated in the direction indicated by the arrows, are shown in such positions that the switches which are operated by the cams 7 and 8 are in normal open position, switches 7c and 8c having just opened; the switches that are operated by the cam 9 are in normal closed positions, switch 9c having just closed; and the switches 10b and 10a, operated by the cam 10, are in normal open position, while the switch 10c, operated by said cam 10, is in closed position. The lengths of the high spots of the cams and the positions of the switches are such that only one switch can be held in off-normal position by a given cam at a time. The high spot of cam 10, for instance, must be sufficiently shorter than the spacing between switches 10c and 10a so that switch 10c will open before switch 10a closes. This is true of the other cams, the high spot of the cam in each case being somewhat shorter than the space between any two of the switches that it operates.

Considering cam 7 and switches 7a, 7b, and 7c, for the moment, the circuit from terminal $L^1$ is open at switch 7a, the circuit from terminal $L^2$ is open at switch 7b, and the circuit from terminal $L^3$ is open at switch 7c. As cam 7 rotates in the direction indicated by the arrow switch 7a will soon close and a circuit will then be established from terminal $L^1$, through switch 7a, through the voltmeter VM, to the neutral wire connected to the terminal $L^N$. Hence, the voltmeter will record the $L^1$ to $L^N$ voltage during the time required for the high spot of cam 7 to complete its passage with respect to the plunger of switch 7a. Similarly, as cam 7 rotates, switches 7b and 7c are closed successively, thereby causing the voltmeter to record the $L^2$ to $L^N$, and the $L^3$ to $L^N$ voltages.

It is obvious that the length of time during which an electrical circuit remains established through the voltmeter depends upon how long it takes the high spot of the cam to complete its passage with respect to the plunger of one of the switches. With a cam high spot of fixed length and with a constant speed of rotation of the cam, the "on" periods will be of equal time duration. The length of time during which an electrical circuit is open, however, depends upon the speed of rotation of the cam and upon how much the spacing between two switches exceeds the length of the cam high spot. With a cam speed of thirty minutes per revolution, for example, and with cam high spot of such length that eight minutes is required for the cam high spot to complete its passage with respect to the plunger of a given switch, the sum total of the three "on" periods is twenty-four minutes, six minutes remaining to be divided into the three "off" periods, and if the switches are spaced symmetrically, 120 degrees apart, the "off" periods would be of two minutes' duration each. However, by moving switch 7c closer to switch 7a the "off" period between switches 7c and 7a could be decreased, and the "off" period between switches 7c and 7b would be correspondingly increased. The switches are disposed in the arrangement illustrated in the drawings so that with the stated length of cam high spot and cam speed, a one minute "off" period precedes the eight minutes $L^1$ to $L^N$ voltage reading, a two minute "off" period precedes the eight minute $L^2$ to $L^N$ voltage reading, and a three minute "off" period precedes the eight minute $L^3$ to $L^N$ reading. Other "on" periods of equal time duration, and other "off" periods of equal or unequal time duration may be obtained by appropriate adjustments of the cam high spot length, cam speed, and switch spacings.

Cam 8 is provided with a high spot which preferably is of the same length as the high spot of the cam 7, and the high spots of the cams 7 and 8 are similarly positioned. Additionally, the switches 8a, 8b, and 8c are preferably positioned with respect to the cam 8, with which they are associated, in the same relation in which the switches 7a, 7b, and 7c, are disposed with respect to the cam 7. While cam 7 is closing and opening the switches 7a, 7b, and 7c during operation of the selector switch mechanism S, the cam 8 likewise closes and opens the switches 8a, 8b, and 8c. This action is ineffective in line to neutral voltage measurements, however, since the circuits which are established by the closing of the switches 8a, 8b, and 8c, remain open at VM². The operation of these switches becomes effective in the measurement of the line to line voltages as will be pointed out later herein.

Cams 9 and 10 and the switches which they operate, serve in the measurement of current in the three lines of a Y or Δ circuit. Cam 9 preferably is provided with a high spot of the same length as the high spot of the cam 7 and which is disposed in the same position as is the high spot of said cam 7. Likewise the switches 9a, 9b, and 9c are preferably located relative to the cam 9, with which they are associated, in accordance with the arrangement of the switches 7a, 7b, and 7c, relative to said cam 7. The switches 10a, 10b, and 10c, associated with the cam 10, occupy positions of relation with respect to said cam 10 similar to the relation of the switches 9a, 9b, and 9c, with respect to the cam 9. However, the high spot of the cam 10 is longer than the high spot of the cam 9 and is positioned so that the switch 10a, the switch 10b, or the switch 10c, will close before the correspondingly positioned switch 9a, 9b, or 9c of the cam 9 opens. Likewise the high spot of the cam 10 is so positioned that the switch 10a, the switch 10b, or the switch 10c will remain closed until the correspondingly positioned switch 9a, 9b, or 9c of the cam 9 has closed.

In Fig. 3 the three lines of the illustrated three-phase system have respectively associated therewith current transformers $T^a$, $T^b$, and $T^c$, and with the cams 9 and 10 in the positions illustrated in Fig. 3, the current transformer terminals $A^1$, $B^1$, and $C^1$ are shunted by the switches 9a, 9b, and 9c, respectively. The switch 10c associated with the cam 10 is closed, and therefore a circuit exists from transformer $T^c$, through the switch 10c, and through the ammeter AM. However, because the terminals C and $C^1$ of the transformer $T^c$ are shunted by the closed switch 9c, no current flows through the ammeter AM. As the cams rotate in the indicated direction, switch 10c will soon open thereby opening the circuit between terminal C and the ammeter, and switch 10a will then close, establishing a circuit between terminal A and the ammeter AM. However, no current will flow through the ammeter because terminals A and $A^1$ of the current transformer $T^a$ are still shunted by the switch 9a. Switch 9a will then open and current will flow from terminal A, through switch 10a, and through the ammeter to terminal $A^1$. This flow of current will continue while cam 9 holds switch 9a open, and when cam 9 allows switch 9a to close, terminals A and $A^1$ will again be shunted by switch 9a and the flow of current through the ammeter will stop, after which switch 10a will open and open the ammeter circuit. In like manner, cam 10 closes and opens switches 10b and 10c, successively, and cam 9 opens and closes switches 9b and 9c, successively, allowing the current from the other current transformers to flow through the ammeter to be recorded.

A complete cycle of operation of the invention as illustrated in Fig. 3 is as follows:

| Time in Minutes | | |
|---|---|---|
| 0 | Switches as illustrated. | Both meters record zero. |
| ⅓ | Switch 10c opens. | |
| ⅔ | Switch 10a closes. | |
| 1 | Switch 9a opens. | Ammeter records A to $A^1$ current. |
| 1 | Switch 7a closes. | Voltmeter records $L^1$ to $L^N$ current. |
| 9 | Switch 9a closes. | Ammeter records zero. |
| 9 | Switch 7a opens. | Voltmeter records zero. |
| 9½ | Switch 10a opens. | |
| 10⅔ | Switch 10b closes. | |
| 11 | Switch 9b opens. | Ammeter records B to $B^1$ current. |
| 11 | Switch 7b closes. | Voltmeter records $L^2$ to $L^N$ voltage. |
| 19 | Switch 9b closes. | Ammeter records zero. |
| 19 | Switch 7b opens. | Voltmeter records zero. |
| 19½ | Switch 10b opens. | |
| 21⅔ | Switch 10c closes. | |
| 22 | Switch 9c opens. | Ammeter records C to $C^1$ current. |
| 22 | Switch 7c closes. | Voltmeter records $L^3$ to $L^N$ voltage. |
| 30 | Switch 9c closes. | Ammeter records zero. |
| 30 | Switch 7c opens. | Voltmeter records zero. |
| | Switches as illustrated. | |

With the voltmeter connected to terminals $VM^1$ and $VM^2$, as shown by dotted lines in Fig. 3, the line to line voltages are recorded. Starting at zero time from the cam positions as illustrated, switches 7a and 8a close after one minute and a circuit is established from terminal $L^1$ through switch 7a, through the voltmeter VM, through the switch 8a to terminal $L^3$. After eight more minutes the switches 7a and 8a open and the circuit is opened. After two more minutes switches 7b and 8b close and a circuit is established from terminal $L^2$, through switch 7b, through the voltmeter, through switch 8b, to terminal $L^1$. After eight more minutes the switches open and the circuit is opened. After three more minutes switches 7c and 8c close and a circuit is established from terminal $L^3$, through switch 7c, through the voltmeter, through switch 8c to terminal $L^2$. After eight more minutes the switches 7c and 8c open and the circuit is opened, with the cams back to their starting positions.

In Fig. 4 is illustrated a portion of such a chart as is prepared in accordance with this invention by operation of the voltmeter VM or the ammeter AM, although the reference characters applied to Fig. 4 identify the particular chart illustrated as a voltmeter chart. In Fig. 4 the recordings designated by the reference character W indicate the voltage of line $L^A$, the recordings designated by the reference character X indicate the voltage of line $L^B$, while the recordings designated by the reference character Y indicate the voltage of line $L^C$. The gaps between the adjacent recordings W, X, and Y, which are designated by the reference characters $Z^1$, $Z^2$, and $Z^3$, result from the "off" periods between operation of the various switches associated with the cams 7 and 8. It is to be noted that the gaps $Z^1$, $Z^2$, and $Z^3$, are of different widths, the gaps $Z^1$ being of a width less than the width of the gaps $Z^2$, while said gaps $Z^2$ are of less width than the gaps $Z^3$. By so differentiating the gaps between the recordings on the chart the recordings of the respective phases may be immediately identified, as a reader of the chart will know that the recordings of phase $L^A$ follow narrow gaps, recordings of phase $L^B$ follow gaps of intermediate width, while recordings of phase $L^C$ follow gaps of the greatest width. Ammeter charts prepared by operation of the cams 9 and 10 will indicate by similar recordings and gaps the load on the feeder.

Figure 1:
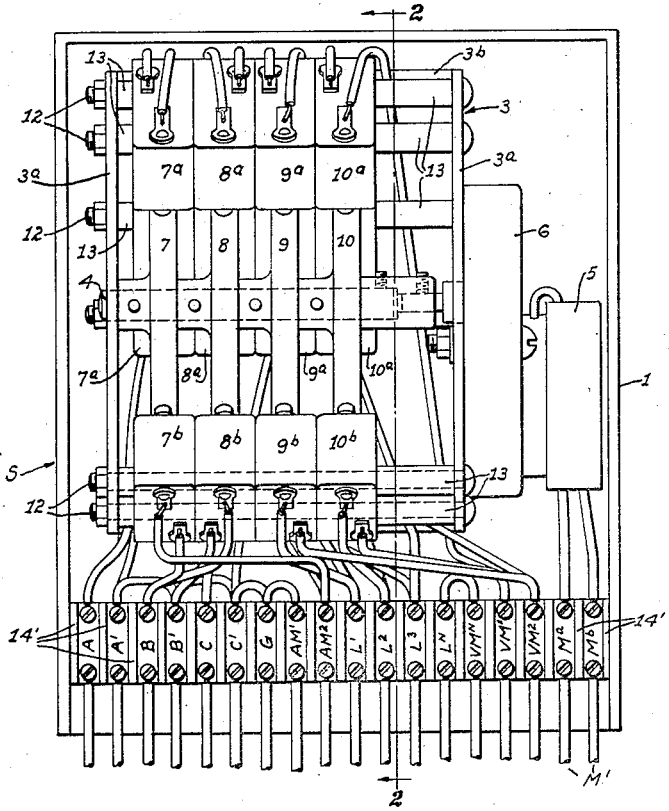
Fig. 1 is a plan view, with the cover removed, of the improved selector switch mechanism which forms a part of this invention.

In Fig. 1 the terminals $M^A$ and $M^B$ have connected thereto conductors which provide the circuit M¹ which leads to the motor 5 and supplies operating energy thereto.

I claim:

1. A mechanism for recording load current or voltage of the various circuits of a multiple-wire electrical distribution system, comprising a single recording meter, a selector switch, electrical conducting means for electrically connecting said selector switch to the various circuits of an electrical dstribution system, and electrical conducting means for electrically connecting said selector switch to the recording meter, said selector switch including means operable to successively establish electrical connection from the various circuits of the distribution system directly to the recording meter so that only one circuit of the distribution system is subjected to measurement at a time, and to maintain such electrical connections with said recording meter for desired time periods during which recordings are made by said recording meter, said means of said selector switch being arranged for such operation that time periods of interruption between successive recording operations of the recording meter are provided for which vary in length.

2. A mechanism for recording load current or voltage of the various circuits of a multiple-wire electrical distribution system which is provided with transformers connected to the various circuits of the distribution system, comprising a single recording meter, a selector switch, electrical conducting means for electrically connecting said selector switch to the secondary windings of the transformers associated with the various circuits of an electrical distribution system, and electrical conducting means for electrically connecting said selector switch to said recording meter, said selector switch including means operable to successively establish electrical connection from the secondary windings of the transformers directly to the recording meter so that only one circuit of the distribution system is subjected to measurement at a time, and to maintain such electrical connections with said recording meter for desired time periods during which recordings are made by said recording meter, said means of said selector switch being arranged for such operation that time periods of interruption between successive recording operations of the recording meter are provided for which vary in length.

THURMAN OAKLEY.

REFERENCES CITED

The following references are of record in the file of this patent:

UNITED STATES PATENTS

| Number | Name | Date |
| --- | --- | --- |
| 1,361,256 | Heath | Dec. 7, 1920 |
| 1,782,525 | Allen | Nov. 25, 1930 |